F. R. FISHBACK.
CONTROL SYSTEM FOR ELECTRIC MOTORS.
APPLICATION FILED FEB. 28, 1910.
1,005,700.
Patented Oct. 10, 1911.
4 SHEETS—SHEET 1.
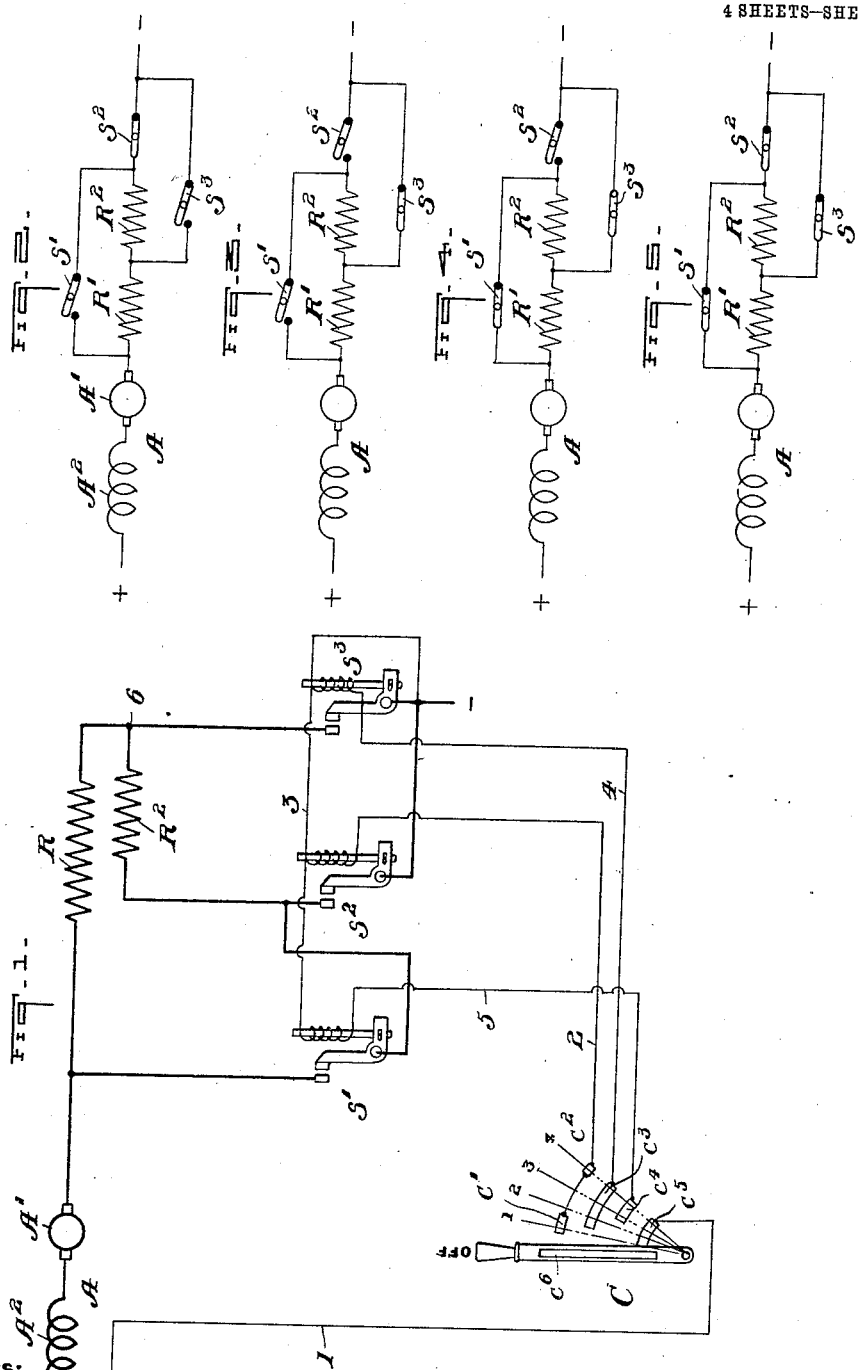

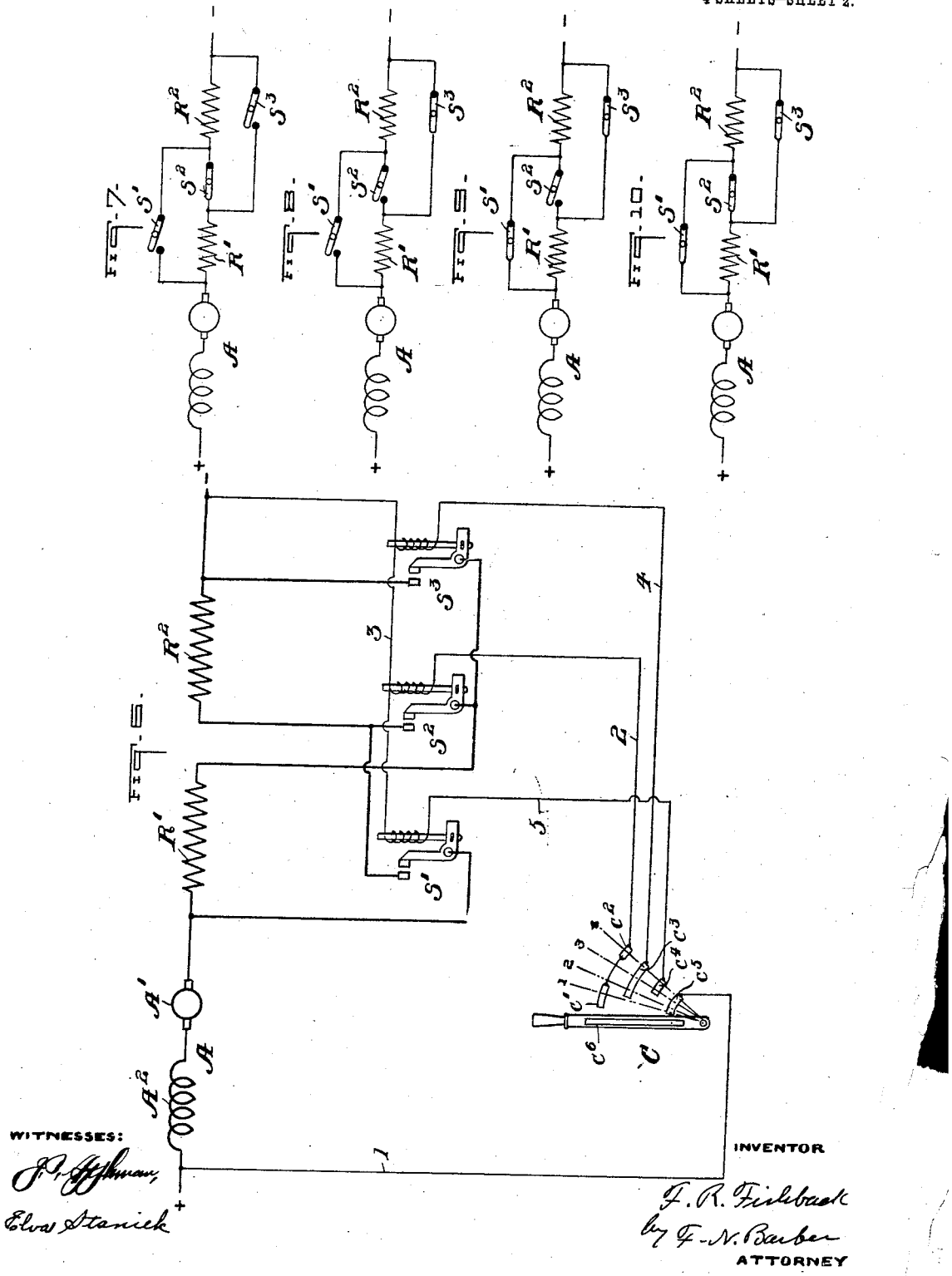

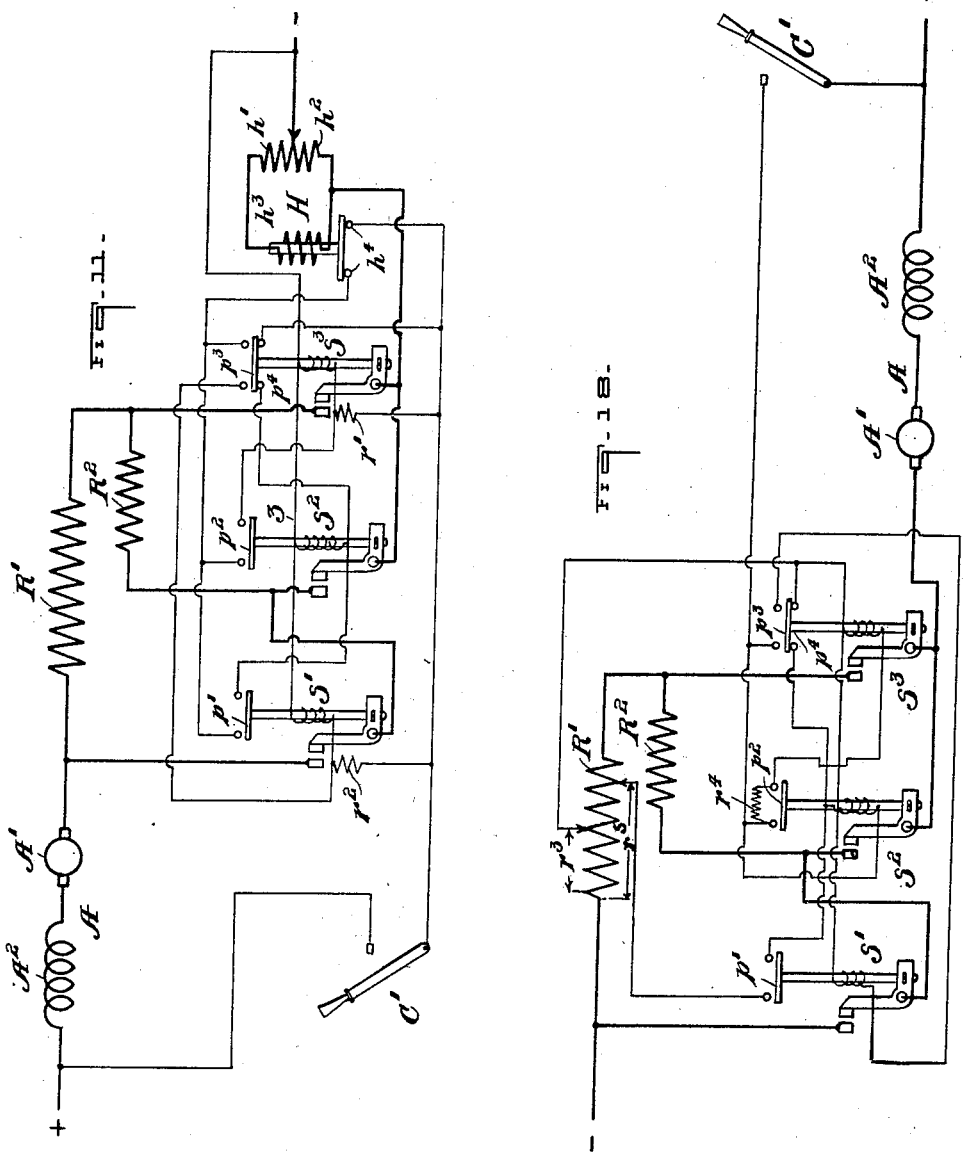

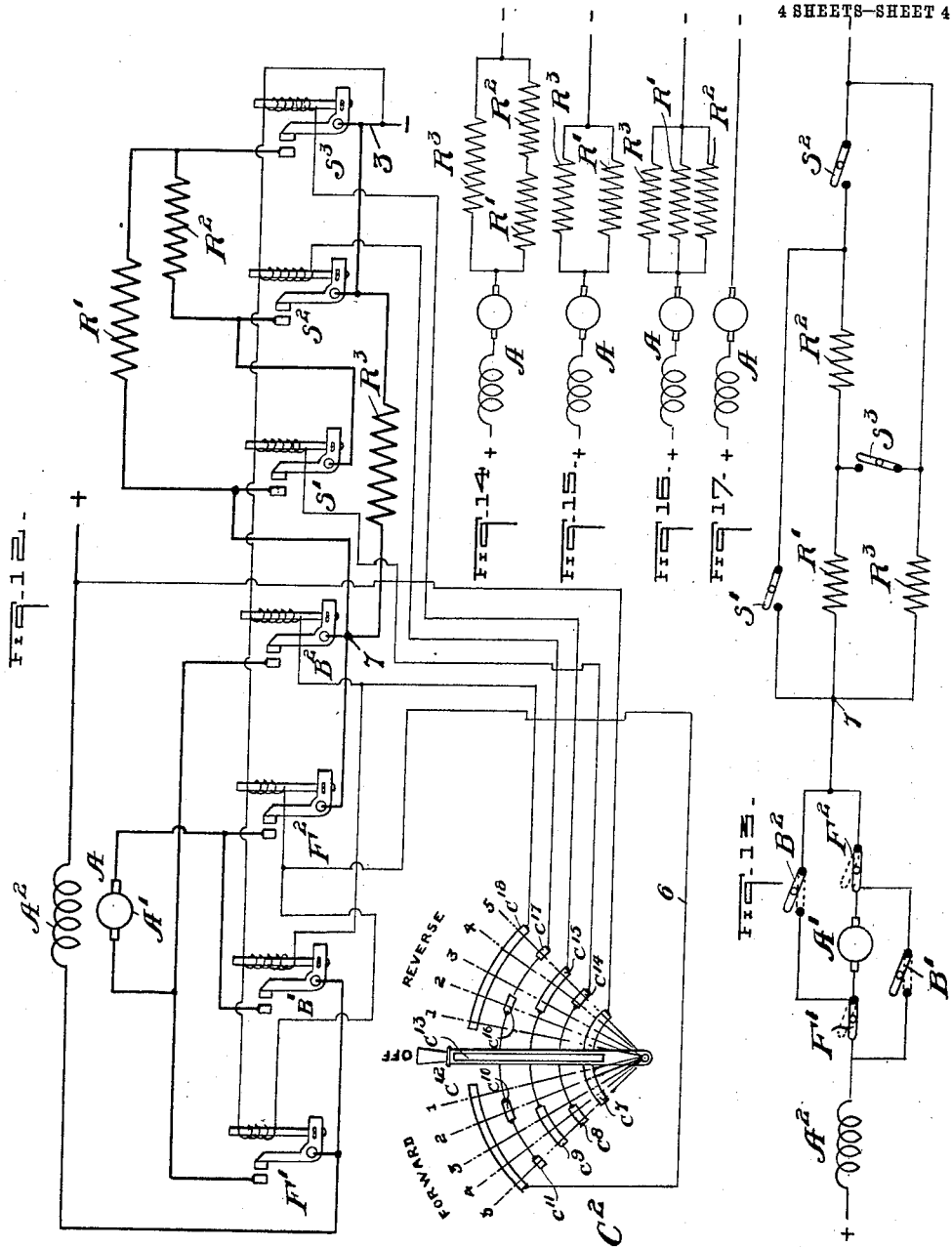
F. R. FISHBACK.
CONTROL SYSTEM FOR ELECTRIC MOTORS.
APPLICATION FILED FEB. 28, 1910.
1,005,700.
Patented Oct. 10, 1911.

UNITED STATES PATENT OFFICE.

FREDERICK R. FISHBACK, OF NEW YORK, N. Y., ASSIGNOR TO THE ELECTRIC CONTROLLER AND MANUFACTURING COMPANY, OF CLEVELAND, OHIO, A CORPORATION OF OHIO.

CONTROL SYSTEM FOR ELECTRIC MOTORS.

1,005,700. Specification of Letters Patent. Patented Oct. 10, 1911.

Application filed February 28, 1910. Serial No. 546,285.

*To all whom it may concern:*

Be it known that I, FREDERICK R. FISHBACK, a citizen of the United States, residing at New York, in the county of New York and State of New York, have invented or discovered new and useful Improvements in Control Systems for Electric Motors, of which the following is a specification.

My invention relates to the rheostatic control of electric motors by means of individual switches operated manually, mechanically, or magnetically.

The objects of my invention are to secure more motor speeds than there are speed-controlling switches used and to increase the efficiency of controllers by a more economical use of the starting resistance.

Referring to the accompanying drawings, Figure 1 is a wiring diagram of a non-reversing controller using three magnetic switches and obtaining four speed points, the switches being controlled directly from the master-switch. Figs. 2, 3, 4, and 5 are simplified diagrams showing the resistance and motor connections at the positions 1, 2, 3, and 4, respectively, on the master-switch. Fig. 6 is the wiring diagram of a controller similar to that shown in Fig. 1, but with a different arrangement of switches and resistances. Figs. 7, 8, 9, and 10 are diagrams showing the arrangement of switches and resistances in the positions 1, 2, 3, and 4, respectively, of the controller shown in Fig. 6. Fig. 11 is a wiring diagram of a non-reversing controller similar to that shown in Fig. 1 but in which only a starting switch is used and the switches close by automatic acceleration. Fig. 12 is a wiring diagram of a reversing controller using three accelerating switches controlled by a master-switch and by which four speeds are obtained in addition to that secured on the closing of the reversing switches. Figs. 13 to 17 show simplified diagrams of the motor and resistance connections at the positions 1, 2, 3, 4, and 5, respectively, on "Forward" side of the master-switch. Fig. 18 shows an automatic controller, in which the automatic acceleration is obtained by the drop-in-potential method.

Referring first to Figs. 1 to 5, A represents the motor having the armature $A'$ and the series field $A^2$. The starting resistances are represented by $R'$ and $R^2$; and the magnetically-operated contractors, by $S'$, $S^2$, and $S^3$. With the arm of the master switch C in the position 1, the brush $c^6$ connects the contacts $c'$ and $c^5$ and establishes a circuit from the positive line through the conductor 1, the contact $c^5$, the brush $c^6$, the contacts $c'$ and $c^2$, the conductor 2, the winding of the switch $S^2$, and the conductor 3 to the negative line. The current in this circuit closes the switch $S^2$, which establishes the motor circuit as follows: from the positive line through the field $A^2$, the armature $A'$, the resistances $R'$ and $R^2$ in series, and the switch $S^2$ to the negative line. The motor is thus connected across the line in series with all the starting resistance, as is clearly shown on the simplified diagram, Fig. 2. To increase the speed of the motor, the arm of the master switch C is moved to the position 2, at which there is closed a control circuit as follows: from the positive line through the conductor 1, the contact $c^5$, the brush $c^6$, the contact $c^3$, the conductor 4, the winding of the switch $S^3$, and the conductor 3 to the negative line. In going to this position the brush $c^6$ has moved off from the contact $c'$, thus opening the circuit of the winding of the switch $S^2$ and permitting the latter switch to open. The brush $c^6$ makes contact with contact $c^3$ before leaving the contact $c'$. The current in the circuit of the winding of the switch $S^3$ closes this switch and completes the motor circuit which is as follows: from the positive line through the field $A^2$, the armature $A'$, resistance $R'$, and the switch $S^3$, to the negative line. The resistance $R^2$ being cut out of the motor circuit, the motor is caused to increase its speed. The circuits for the position 1 are shown simplified on Fig. 3. To further increase the speed of the motor, the arm of the master switch C is moved to the position 3, in which the brush $c^6$ connects the contacts $c^3$, $c^4$, and $c^5$, thus closing the control circuit from the positive line through the conductor 1, the contact $c^5$, and the brush $c^6$, from which two parallel circuits pass to the conductor 3, one being through the contact $c^3$, the conductor 4 and the winding of the switch $S^3$, and the other through the contact $c^4$, the conductor 5 and the winding of the switch $S'$. From the conductor 3 the control circuit leads to the negative line. In position 3 both the switches $S'$ and $S^3$ are closed and the motor circuit is established as follows:—from the positive line through the field $A^2$, the armature $A'$, from which the circuit divides, one branch containing the resistance $R'$ and the other, the switch $S'$ and the resistance $R^2$. These branches unite at the point 6, whence the circuit passes through the switch $S^3$ to the negative line. In the position 3 the resistances $R'$ and $R^2$ are in parallel as clearly shown in the simplified diagram, Fig. 4. To still further increase the speed of the motor, the arm of the master switch C is moved to the position 4, in which the brush $c^6$ connects the contacts $c^2$, $c^3$, $c^4$, and $c^5$, thereby establishing the following control circuit:—from the positive line through the conductor 1, the brush $c^6$, the contacts $c^2$, $c^3$, and $c^4$, the conductors 2, 4, and 5 in parallel to the windings of the switches $S'$, $S^2$, and $S^3$ in parallel to the conductor 3 and thence to the negative line. In this position of the master switch, the resistances $R'$ and $R^2$ are short-circuited by the switches $S'$ and $S^2$, thus permitting the motor to obtain its maximum speed. The circuits for this position are shown simplified in Fig. 5.

By the described arrangement of the switches and resistances combined with the order in which they are closed, it is seen that four speeds can be obtained by the use of three switches. While I have shown on Fig. 1 magnetically operated switches $S'$, $S^2$, and $S^3$, it is clear from Figs. 2, 3, 4, and 5 that knife switches could be substituted for the magnetically operated switches without in the least departing from the principles of my invention.

Referring now to Figs. 6 to 10, I show a controller similar to that shown in Figs. 1 to 5 but the switches and resistances are somewhat differently arranged. If the arm of the master switch C be thrown to the position 1, the control circuit will be established as in Fig. 1 through the winding of the switch $S^2$. The current in this control circuit causes the switch $S^2$ to close and establish the following motor circuit: from the positive line through the field $A^2$, the armature $A'$, the resistance $R'$, the switch $S^2$, and the resistance $R^2$ to the negative line. The motor circuit for this position of the master switch is shown simplified in Fig. 7. When the arm of the master switch C is moved to the position 2 the winding of the switch $S^3$ is energized, causing the switch $S^3$ to close and establish the following motor circuit: from the positive line through the field $A^2$, the armature $A'$, and the switch $S^3$ to the negative line. In this position of the master switch the resistance $R^2$ is cut out since the brush $c^6$ has moved away from the contact $c'$. The motor circuit for this position of the master switch is shown simplified in Fig. 8. When the master switch is moved to the position 3, the brush $c^6$ engages the contact $c^4$ and still remains in contact with the contact $c^3$. The winding of the switch $S'$ is thus energized, causing the switch $S'$ to close, whereupon a motor circuit, in addition to that described as existing when the master switch was in the position 2, is established as follows:—from the negative terminal of the armature $A'$ through the switch $S'$ and the resistance $R^2$ to the negative line. It is thus seen that when the master switch is in the position 3, the resistances $R'$ and $R^2$ are in parallel, thus reducing the resistance in the motor circuit and causing the motor to speed up. The motor circuit existing when the master switch is in the position 3 is shown simplified in Fig. 9. To further increase the speed of the motor the arm of the master switch C is thrown to the position 4, in which the control circuit is established in parallel through the windings of the switches $S'$, $S^2$, and $S^3$, causing all three of these switches to close. The motor circuit thus established is as follows:—from the positive line through the field $A^2$, the armature $A'$ and the switches $S'$, $S^2$, and $S^3$ to the negative line. The resistances $R'$ and $R^2$ being cut out of the motor circuit permits the motor to obtain its maximum speed. The motor circuit existing when the master switch is in the position 4 is shown simplified on Fig. 10.

Referring now to Fig. 11 I show a controller in which the master switch consists of a single pole knife-switch $C'$ and in which the throttle H is added to control the closing of the magnetic switches $S'$, $S^2$, and $S^3$ in their proper order, which is the same as that described in reference to the switches $S'$, $S^2$, and $S^3$ on Fig. 1. Upon closing the switch $C'$ a circuit is established from the positive line through the switch $C'$, the lower auxiliary contacts $p^4$ of the switch $S^3$, the winding of the switch $S^2$ and the wire 3 to the negative line. This circuit causes the switch $S^2$ to close and establishes a motor circuit as follows:—from the positive line through the field $A^2$, the armature $A'$, the resistance $R'$, the resistance $R^2$, the switch $S^2$ and the throttle H to the negative line. The current to the throttle H divides, part of it passing through the resistance section $h'$. The divided circuit re-unites at the junction of the sections $h'$ and $h^2$, which junction can be adjusted to give the current in the winding $h^3$ its proper value. The first rush of current energizes the winding $h^3$ which opens the throttle H at the contact $h^4$. The motor starts with the resistances R' and R² in series. As soon as the motor speeds up and the current reaches a predetermined value, the winding $h^3$ will permit the throttle H to close the control contacts $h^4$, whereupon a circuit is established from the positive line through the switch C', the contacts $h^4$ of the throttle, the auxiliary contacts $p^2$ of the switch S², and the winding of the switch S³ to the negative line. The current in this circuit closes the switch S³, short-circuiting the resistance R², thus permitting more current to pass through the motor and causing it to speed up. The increase of current in the motor causes the winding $h^3$ to open the contacts $h^4$ again and prevents any further change in the control circuit until such time as the current in the motor circuit lowers to a predetermined value. Although the control circuit is open at the contacts $h^4$ the switch S³ remains closed by reason of the resistance $r'$ which permits sufficient current to pass from the positive line through the winding of the switch S³ to maintain it in its closed position, but is of such value as to prevent sufficient current from passing through the winding of the switch S³ and from closing the switch S³ when open. The closing of the switch S³ opens the auxiliary contacts $p^4$, which opens the circuit to the winding of the switch S², thus causing the switch S² to open and cut out the resistance R². The motor circuit just described is shown simplified in Fig. 3. The closing of the switch S³ also closes the auxiliary contacts $p^3$ and as soon as the motor speeds up to such an amount as to allow its current to decrease to a predetermined value, the throttle H again closes the contact $h^4$. A control circuit is thus established as follows:—from the positive line through the switch C', the contact $h^4$ of the throttle H, the auxiliary contacts $p^3$, the winding of the switch S' and the wire 3 to the negative line. The energizing of the winding of the switch S' closes the said switch and connects the motor in series with the resistances R' and R² in parallel, the motor circuits being the same as shown in Fig. 4. The increase of current due to the reducing of the resistance in the motor circuit again causes the throttle H to open the contacts $h^4$; but a circuit from the positive line through the switch C' and the resistance $r^2$ to the winding of the switch S' prevents the switch S from opening in the same manner that the resistance $r'$ prevents the switch S³ from opening. When the switch S' closes it also closes the auxiliary contacts $p'$; and when the motor current again diminishes to a predetermined value sufficiently to cause the throttle H to again close the contacts $h^4$, a control circuit is established through the switch C', the contacts $h^4$ of the throttle H, the auxiliary contacts $p'$, the winding of the switch S², and the wire 3 to the negative line. The switch S² thereupon closes. As all of the switches S', S², and S³ are now closed, the motor is connected directly across the line as shown in Fig. 5 thereby causing the motor to run at maximum speed.

It will be seen from Fig. 11 that I show an automatic controller which will upon the closure of the single pole starting-switch give four points of acceleration with the use of but three magnetic switches.

In Figs. 12 to 17 I show a reversing controller, in which two pairs of reversing switches F' and F² and B' and B² are used with the acceleration switches S', S², and S³. For the sake of simplicity I have omitted the throttle H shown in Fig. 11, but it can obviously be used. If the controller handle shown in Fig. 12 is thrown to the position 1 on the "Forward" side of the master controller C², a circuit will be established from the positive line through the contact $c^7$, the brush $c^{13}$, the contact $c^{12}$, the conductor 6, the windings of the switches F' and F² and the wire 3 to the negative line. The current in this circuit closes the switches F' and F² and establishes a motor circuit as follows:—from the positive line through the field A², the switch F', the armature A', the switch F², the point 7, and the resistance R³ to the negative line. The current in this circuit starts the motor in the forward direction. The connections for the motor circuit thus traced are shown simplified in Fig. 13. If the controller handle is moved to the position 2 on the "Forward" side of the master switch, obviously the switch S² closes, a part of the current passing from the point 7 through the resistances R' and R² and the switch S² to the negative line. Thus, in the second "Forward" position of the master switch, the motor is in series with the resistance R³ in parallel with the two resistances R' and R² which are in series with each other. The motor circuit for this position of the master switch is shown simplified in Fig. 14. If the controller handle is further moved to the position 3 on the "Forward" side, the switch S³ closes and the switch S² opens, thus cutting out the resistance R². We now have in series with the motor the resistances R' and R³ in parallel as shown in the simplified diagram, Fig. 15. On the further movement of the controller handle to the position 4 on the "Forward" side, the switch S' closes and there are three paths for the motor circuit to reach the negative:—through the resistance R' to the switch S³; through the resistance R² and the switch S³; and through the resistance R³. In this position of the master switch the three resistances are in parallel as shown in the simplified diagram Fig. 16. On moving the controller handle to position 5 on the "Forward" side the switch $S^2$ is closed and the motor circuit passes through the switches $S'$ and $S^2$, thus short-circuiting all the resistances and placing the motor directly across the line, which permit the motor to obtain maximum speed. The motor circuit for this position of the master switch is shown simplified on Fig. 17. It is thus seen that in addition to one speed of the motor which can be obtained on the closure of the reversing switches, four more speeds are obtained by the use of three more switches. If the master switch be thrown to the position 1 on the reverse side, a control circuit is established from the positive line through the contact $c^7$, the brush $c^{13}$, the contact $c^{18}$, the windings of the switches $B'$ and $B^2$ and the wire 3 to the negative line. The brush $c^{13}$ being moved from the contact $c^{12}$, deënergizes the windings of the switches $F'$ and $F^2$ and permits these switches to open. The control circuit just described causes the switches $B'$ and $B^2$ to close and establishes the following motor circuit:—from the positive line through the field $A^2$, the switch $B'$, the armature $A'$ in the direction opposite to that before described, the switch $B^2$, the point 7 and the resistance $R^3$ to the negative line. The motor circuits for this position of the master switch are shown on Fig. 13, with the switches $F'$, $F^2$, $B'$, and $B^2$ in their dotted positions. It is clear from Fig. 13 with the said reversing switches in their dotted positions that the current through the field $A^2$ flows in the same direction as before but that the current through the armature $A'$ flows in a reverse direction, thus causing the armature to reverse its rotation. Upon moving the controller arm to the positions 2, 3, 4, and 5 on the "Reverse" side, it is obvious that the motor circuits will be the same as shown on Figs. 14, 15, 16 and 17 except that the direction of current flowing through the armature is reversed. Consequently, it is not necessary to describe in detail the circuits for these four positions of the master switch.

Referring now to Fig. 18 I show an automatic controller in which a starting switch is used, the magnetic switches $S'$, $S^2$, and $S^3$ close by automatic acceleration by means of the drop-in-potential method. The windings of the switches $S'$, $S^2$, and $S^3$ are so designed that each will close its respective switch when a certain per cent. of full voltage is applied to the winding terminals. After one of these switches is closed it will remain closed on a reduction of voltage. If the switch $C'$ is closed, a circuit is established from the positive line through the switch $C'$, the winding of the switch $S^2$, the resistance $r^3$ to the negative line. The resistance $r^3$ is very small so that the switch $S^2$ immediately closes and the motor circuit is established from the positive line through the field $A^2$, the armature $A'$, the switch $S^2$, the resistance $R^2$, and the resistance $R'$ to the negative line. This allows current to flow, starting the motor. As soon as the switch $S^2$ closes, its auxiliary contacts $p^2$ close and the winding of the switch $S^3$ is subjected to a voltage equal to the line voltage minus the drop due to the motor current flowing in the resistance $r^3$. When the current has decreased to said per cent. of the full-load, the switch $S^3$ closes, which short-circuits the resistance $R^2$ increasing the motor current and further increasing its speed. When the switch $S^3$ closes its auxiliary contact $p^4$ is open, causing the switch $S^2$ to open. The winding of the switch $S^3$ is still energized through the resistance $r^4$, which connects the fixed contacts of the auxiliary switch $p^2$. The resistance $r^4$ is so chosen that the switch $S^3$ will not close from its full open position when the resistance $r^4$ is in series with the winding of the switch $S^3$. The closing of the switch $S^3$ also closes its auxiliary contact $p^3$ which causes current to flow through the winding of the switch $S'$, it being subject to the same method of excitation as was the winding of the switch $S^3$ when it was first energized. This circuit through the auxiliary contacts $p^3$ is from the positive line through the switch $C'$, the auxiliary contacts $p^3$, the winding of the switch $S'$, the resistance $r^3$ to the negative line. As soon as the motor current drops to said per cent. of the full load, the drop through the resistance $r^3$ has diminished so that the switch $S'$ can close. This reduces the resistance in series with the motor by connecting the resistances $R'$ and $R^2$ in parallel which still further increases the speed of the motor. The closing of the switch $S'$ closes its auxiliary contact $p'$ which causes current to flow which partially energizes the winding of the switch $S^2$, current flowing from the positive line through the switch $C'$, the winding of the switch $S^2$, the auxiliary contacts $p'$ and the resistance $r^5$ to the negative line. The resistances $R'$ and $R^2$ being equal the motor current is divided between them. Therefore, to obtain the same drop-in-potential on the winding of the switch $S^2$ as was obtained on the windings of the switches $S'$ and $S^3$, the resistance $r'$ must be twice the value of the resistance $r^3$. When the motor current again decreases to said per cent. of the full-load, one-half of the value of the full-load flowing through the resistance $R'$, the voltage drop is something more than one-half of the full-voltage and the switch $S^2$ closes placing the motor directly across the line. The switches $S'$, $S^2$, and $S^3$ close in the same order as described with reference to Figs. 2 to 5. I have thus shown that a motor may be automatically started and brought up to full-speed, the closing of the successive switches being governed by the current flowing in the motor, and four accelerating points being secured by the use of only three switches.

It will be noticed by reference to the simplified diagrams that the resistance R' is used in all of the first three relations and that the resistance R² is used in two of them. In the ordinary control systems using four speeds, the resistance is divided into three sections, one being used in three of the relations, another in two and the third in one relation. It is thus clear that in a four speed controller I obtain a more economical use of resistance during the acceleration of the motor by using all of the resistances during two-thirds of the number of accelerating points in which resistance is used.

I claim—

1. In a motor control system, a single motor, a circuit for connecting the motor to a source of supply, resistance, switches to vary the resistance in the said circuit, some of the said switches being arranged so that, when closed the second time, a different amount of the said resistance is connected in said circuit than when closed the first time.

2. In a motor control system, a motor, a circuit for connecting the motor to a source of supply, resistance, switches to vary the grouping of the resistance in the said circuit, some of the said switches being arranged to close a second time and give a different grouping of the said resistance than when closed the first time.

3. In a motor control system, a motor, a circuit therefor, resistance arranged in sections, switches arranged to include more or less of said resistance in the motor circuit, the number of the said switches being one more than the number of resistance sections inserted in, or removed from, the motor circuit by the said switches, and an additional resistance in the motor circuit, external to a circuit including any of said switches.

4. In a motor control system, a motor, a circuit therefor, resistance arranged in sections, a switch arranged to connect a point between two of said sections to one side of the line, a second switch arranged to connect a point between one terminal of the armature and the remaining terminal of one of said two sections to one terminal of the other of said two sections, and a third switch arranged to coöperate with the first two switches to connect the said two sections in series with the motor and to short-circuit the said sections.

5. In a motor control system, a motor, a circuit therefor, resistance arranged in sections, a switch arranged to connect a point between two of said sections to one side of the line, a second switch arranged to connect a point between one terminal of the armature and the remaining terminal of one of said two sections to the remaining terminal of the other of said two sections, and a third switch arranged to coöperate with the first two switches to connect the said two sections in series with the motor and to short-circuit the said sections and to connect said sections in parallel.

6. In a motor control system, a motor, a circuit for connecting the motor to a source of supply, resistance in the said circuit, switches for controlling the resistance, some of the switches being arranged to close a second time and control the resistance differently than when closed the first time.

7. In a motor control system, a motor, a circuit therefor, resistance arranged in sections, switches arranged to include more or less of said resistance in the motor circuit, the number of the said switches being one more than the number of resistance sections inserted in, or removed from, the motor circuit by the said switches, and an additional resistance not in a circuit including any of said switches.

8. In a motor control system, a motor, a circuit therefor, sections of resistance, acceleration switches to vary the number and grouping of the sections of the resistance in the motor circuit, some of the said switches being so arranged that, when closed the second time, the resistance permits a current of a different voltage to be applied to the armature terminals than when closed the first time, and means for causing the acceleration switches to close.

9. In a motor control system, a motor, a circuit therefor, resistance sections, accelerating switches to connect the resistance sections to the motor circuit so that the number of speeds of the motor as determined by the resistance shall be the number of the said switches (excluding reversing switches) less one multiplied by two.

10. In an electric controller, two resistances, circuits therefor, a switch to connect them in series with a source of supply, switch mechanism arranged to coöperate with the said switch, when the latter is closed a second time, to cause the said switch to short-circuit one of the resistances.

11. In a current-varying controller, two resistances, circuits therefor, a switch for connecting said resistances in series, a pair of switches for connecting said resistances in parallel, and a master controller for operating said switches.

12. In a current-varying controller, two resistances, circuits therefor, a switch for connecting said resistances in series, two more switches for connecting said resistances in parallel, means for causing said first switch to subsequently short-circuit both resistances, and a master controller for operating said switches.

13. In a motor control system, a motor, resistance, a circuit therefor, a main switch for connecting the motor across the line with the resistance in series therewith, and means for causing said switch to open and close subsequently to cut out the resistance.

Signed at New York, N. Y. this 24th day of February, 1910.

FREDERICK R. FISHBACK.

Witnesses:
LAURA E. SMITH,
JENNIE H. GOLDSTEIN.

Copies of this patent may be obtained for five cents each, by addressing the "Commissioner of Patents, Washington, D. C."